(12) United States Patent
Rumler et al.

(10) Patent No.: US 11,585,405 B2
(45) Date of Patent: Feb. 21, 2023

(54) ASSEMBLY OF A TOWER SECTION OF A WIND TURBINE TOWER

(71) Applicant: Siemens Gamesa Renewable Energy A/S, Brande (DK)

(72) Inventors: Malte Herbert Rumler, Mettingen (DE); Madhup Tiwari, Bangalore (IN)

(73) Assignee: SIEMENS GAMESA RENEWABLE ENERGY A/S, Brande (DK)

( * ) Notice: Subject to any disclaimer, the term of this patent is extended or adjusted under 35 U.S.C. 154(b) by 222 days.

(21) Appl. No.: 16/804,034

(22) Filed: Feb. 28, 2020

(65) Prior Publication Data

US 2020/0284315 A1 Sep. 10, 2020

(30) Foreign Application Priority Data

Mar. 7, 2019 (EP) ..................................... 19161312

(51) Int. Cl.
*F16F 15/023* (2006.01)
*F03D 13/20* (2016.01)
(Continued)

(52) U.S. Cl.
CPC .............. *F16F 15/023* (2013.01); *B61B 3/00* (2013.01); *F03D 13/20* (2016.05); *F16F 7/1034* (2013.01);
(Continued)

(58) Field of Classification Search
CPC ................... F16F 15/023; F16F 7/1034; F16F 2230/0005; F16F 2226/04; F03D 13/20;
(Continued)

(56) References Cited

U.S. PATENT DOCUMENTS 4,937,929 A * 7/1990 Nokajima ............... B61B 13/02
29/430
6,705,817 B2 * 3/2004 Wittenstein .............. B64D 9/00
414/373
(Continued)

FOREIGN PATENT DOCUMENTS

CN 102828922 A 12/2012
EP 2899397 B1 1/2017
(Continued)

OTHER PUBLICATIONS

European Search Report and Written Opinion of the European Searching Authority dated Dec. 18, 2019 for Application No. 19161312.4.

*Primary Examiner* — Vishal R Sahni
(74) *Attorney, Agent, or Firm* — Schmeiser, Olsen & Watts LLP

(57) ABSTRACT

A method of assembling a tower section of a wind turbine tower is provided. The method includes arranging the tower section of the wind turbine tower in a horizontal orientation; transporting a damper unit to a position inside the tower section while the tower section is arranged in the horizontal orientation; and mounting the damper unit to the tower section, wherein the damper unit is configured to damp motions of the wind turbine tower. Further, a horizontal transport system is provided that is supported at least at one position by the tower section and that includes a movable part configured to support a damper unit and to transport the damper unit in a horizontal direction from a position adjacent to an end of the tower section to a position at or adjacent to a mounting position of the damper unit inside the tower section.

9 Claims, 9 Drawing Sheets

(51) Int. Cl.
*B61B 3/00* (2006.01)
*F16F 7/10* (2006.01)

(52) U.S. Cl.
CPC ... *F16F 2226/04* (2013.01); *F16F 2230/0005* (2013.01)

(58) Field of Classification Search
CPC ........ B61B 3/00; B65G 63/02; B65G 63/022; B65G 63/027; B65G 63/04; B65G 63/042; B65G 63/045; B65G 63/047
USPC .......................................................... 414/542
See application file for complete search history.

(56) References Cited

U.S. PATENT DOCUMENTS

| | | | |
|---|---|---|---|
| 2006/0151296 A1* | 7/2006 | Halang | B65G 47/244 198/623 |
| 2006/0186271 A1* | 8/2006 | Jacobsen | B60P 1/36 244/137.1 |
| 2006/0275121 A1* | 12/2006 | Merswolke | F03D 9/28 416/132 B |
| 2011/0320035 A1* | 12/2011 | Kharkover | E04H 6/22 700/218 |
| 2013/0297065 A1* | 11/2013 | Huber | B64D 9/00 700/230 |
| 2016/0215754 A1 | 7/2016 | Seidel | |
| 2017/0138351 A1* | 5/2017 | Tobinaga | F03D 80/82 |
| 2021/0172490 A1* | 6/2021 | Starossek | F16F 15/223 |
| 2021/0254605 A1* | 8/2021 | Madsen | F03D 7/0296 |
| 2021/0301789 A1* | 9/2021 | Scheller | F03D 13/40 |

FOREIGN PATENT DOCUMENTS

| | | | | |
|---|---|---|---|---|
| EP | 3156647 A1 | | 4/2017 | |
| KR | 2011114828 A | * | 10/2011 | ............ B62H 3/12 |
| WO | 2019029839 A1 | | 2/2019 | |

* cited by examiner

ASSEMBLY OF A TOWER SECTION OF A WIND TURBINE TOWER

CROSS-REFERENCE TO RELATED APPLICATIONS

This application claims priority to European Application No. 19161312.4, having a filing date of Mar. 7, 2019, the entire contents of which are hereby incorporated by reference.

FIELD OF TECHNOLOGY

The following relates to a method of assembling a tower section of a wind turbine tower, to a horizontal transport system used for assembling such tower section and to a respective tower section of a wind turbine tower. In particular, the following relates to the mounting of a damper unit in such tower section of a wind turbine tower.

BACKGROUND

Wind turbines must withstand considerable wind forces that act on the rotor, the nacelle and the tower of the wind turbine. Wind turbines experience dynamic load conditions due to the random character of the applied wind forces. The tall and slender wind turbine tower carries the nacelle which comprises the generator and further components and which supports the rotor, so that the center of mass of the wind turbine is positioned high above the ground. The applied dynamic forces result in movements of the upper part of the wind turbine, including so called Fore-Aft movements and Side-to-Side movements. Oscillation modes of the wind turbine tower can be excited, in particular when the frequencies of such modes get close to the rotor induced vibrations. A wind turbine has to withstand such dynamic mechanical loads during its lifetime of more than 25 years.

Due to the forced movement and vibrations, the tower experiences fatigue under operation and standstill throughout the lifetime of the wind turbine. Therefore, the turbine tower has to be designed in a way to withstand these loads, which requires a higher thickness of the tower shell or of the diameter of the cylindrical tower. Such measures increase the amount of material required for the tower, which increases the weight and the cost of the tower and of its individual tower sections. Since the tower sections have to be transported on the road or by boat to the installation site, the weight and size of such tower sections is limited due to traffic, road or boat requirements.

To address the above problems, it is known to install a damper in the uppermost section of the wind turbine tower or inside the nacelle. The damper reduces the motion of the wind turbine tower and can tune the frequencies of the oscillation modes of the wind turbine tower in a favorable manner. An example of such damper is described in the document EP 2 899 397 B1, wherein a damper having a toroidal shape is placed at the top of the tower or at the nacelle. With the increasing size of wind turbine towers, the damper required to provide efficient damping has to increase significantly in weight and size. Accordingly, it becomes problematic to install such dampers in wind turbine towers or to transport tower sections with installed dampers.

In particular, damper units with individual weights of 8 t or more can no longer be lifted into place using telehandlers with telescopic booms, which have been used in the past to install such dampers. Also, current installation methods have an increased health and safety risk as the damper is generally installed as a suspended load, and work has to be performed in the area of the suspended damper.

Installing the damper prior to transport of the tower section can result in problems of transport safety. In particular, an uneven weight distribution can lead to a rocking and rolling of the trailer and can further lead to imbalances when the tower section is to be shipped by boat.

It is desirable to facilitate the mounting of a damper to a wind turbine tower and to make such mounting procedure more safe and efficient. It is in particular desirable to mount the damper such that the available space can be utilized in the best possible way while ensuring that the assembly is fast and efficient and minimizes safety risks.

SUMMARY

An aspect relates to improving the equipping of a wind turbine tower with a damper. There is in particular a need for an efficient and safe installation of such dampers.

According to an embodiment of the invention, a method of assembling a tower section of a wind turbine tower is provided. The method comprises the steps of arranging the tower section of the wind turbine tower in a horizontal orientation; transporting a damper unit to a position inside the tower section while the tower section is arranged in the horizontal orientation; and mounting the damper unit in the tower section, wherein the damper unit is configured to damp motions of the wind turbine tower, in particular when the wind turbine tower is erected and in operation.

By means of such method, the damper unit can be mounted efficiently in the tower section. Further, such mounting method allows the mounting of the damper unit deep inside the tower section while reducing safety risks for the personnel carrying out the assembly of the tower section.

The damper unit is in particular transported in a horizontal direction. Horizontal orientation of the tower section in particular refers to an orientation in which the longitudinal direction of tower section extends in a substantially horizontal direction, i.e. it may extend substantially parallel to the earth's surface. It should be clear that the tower section may have a slightly conical shape so that the longitudinal axis of such shape is not entirely parallel to a horizontal plane when the tower section is for example supported on supports of equal height. The damper unit may in particular be configured to damp motions and oscillations of the wind turbine tower that are caused by the dynamic loads applied to the wind turbine tower when it is erected and in operation or in standby. The tower section may in particular be a top section of the wind turbine tower.

In an embodiment, transporting the damper unit into the tower section comprises employing a horizontal transport system to transport the damper unit in a horizontal direction to a position inside the tower section. The horizontal transport system may be supported at least at one position by the tower section. The transport system may for example be supported at a flange of the tower section, or may be supported at a position inside the tower section (i.e. within an outer wall of the tower section). By means of such transport system, it becomes possible to transport the damper unit a significant distance into the tower section even though the tower section is oriented horizontally and the damper unit has a significant weight. The position inside the tower section to which the damper unit is transported may be a mounting position at which the damper unit is to be mounted to the tower section, or may be adjacent to such mounting position.

In an embodiment, the horizontal transport system is on one side supported by the tower section and is on the opposite side supported outside the tower section. It should be clear that the transport system may be supported at further positions inside and outside of the tower section. Mounting the damper unit in the tower section may comprise transporting the damper unit from a position outside the tower section to the position inside the tower section using the horizontal transport system. Thus, the damper unit can be supported by the transport system already outside the tower section so that no further equipment is required to move the damper unit into the tower section, thereby facilitating assembly.

In an embodiment, the horizontal transport system comprises a trolley. Mounting the damper unit in the tower section comprises supporting the damper unit by the trolley and moving the trolley to transport the damper unit in the horizontal direction to the position. Complexity of the transport system may thus be kept low while the transport system allows the damping unit to be transported a significant distance into the tower section. It may even allow the damping unit to be introduced from a lower end of the tower section while the mounting position is located close to the top end of the tower section.

The trolley may for example comprise wheels running on an inner wall of the tower section.

In other embodiments, the horizontal transport system comprises a rail, wherein the trolley is running on the rail. For example, the rail can be an upper rail and the damping unit can be suspended from the trolley, or the rail can be a lower rail on which the trolley is running and the damping unit can be disposed on top of the trolley. By such arrangements, the transport system can extend any desirable distance into the tower section so that the mounting position and the tower end through which the damping unit is introduced into the tower section can be freely chosen by the assembly personnel. The transport system can in particular be mounted to the inside of the tower section.

It is further beneficial if transporting the damper unit into the tower section comprises transporting the damper unit in a horizontal direction to a position inside the tower section and rotating the damper unit while the damper unit is at the position inside the tower section. This way, the damper unit may be introduced into the tower section in an orientation that is different to the orientation in which the damper unit is finally mounted inside the tower section. The size, for example the lateral extension of the damper unit may thus be larger than an opening of the tower section through which the damper unit is introduced into the tower section, such as the opening in the top end of the tower section.

In particular, the damper unit may be moved towards the mounting position and may be rotated at or adjacent to the mounting position. In other implementations of the method, the damping unit may be moved into the tower, may be rotated and may then be moved to the mounting position.

For example, the trolley may comprise a rotating element, such as a turn table, in particular a hydraulic turn table, to effect rotation of the damper unit while the damper unit is supported by the trolley (e.g. disposed on the trolley or suspended from the trolley).

In an embodiment, the damper unit extends in a longitudinal direction, wherein transporting the damper unit into the tower section comprises orienting the damper unit such that its longitudinal direction is substantially parallel to a horizontal transport direction; transporting the damper unit along the horizontal transport direction to a position inside the tower section; and rotating the damper unit while the damper unit is located inside the tower section such that its longitudinal direction is substantially perpendicular to the horizontal transport direction. Orienting the damper unit with its longitudinal direction substantially parallel to a horizontal transport direction may in particular be performed such that the damper unit fits through an opening in the tower section through which it is to be transported (for example at the upper end of the tower section), i.e. it does not need to be precisely parallel to the transport direction.

The horizontal transport system may be configured to transport the damper unit to a position that has a distance of at least 4 m, at least 6 m, more at least 8 or 10 m from either end of the tower section.

In an embodiment, transporting the damper unit to a position inside the tower section comprises transporting the damper unit to a position inside the tower section that has a distance from either end of the tower section of at least 4 m. The position has a distance to either end of at least 6 m or of even at least 8 or 10 m. The distance may for example be measured between the center of gravity of the damping unit and a mounting flange on the respective end of the tower section (i.e. the end of the tower section in longitudinal direction). By such assembly method, the damper unit may be mounted significantly deeper inside the tower section. This provides enhanced possibilities for damper arrangements, which can for example be located further to the middle of the tower section for damping particular modes, or for the arrangement of plural damper units at different positions along the tower section.

The position to which the damper unit is transported is located in the top half of the tower section, for example below an upper conical part of the tower section. Top half in this context refers to the half of the tower section that is the top half when the tower section forms part of an erected wind turbine tower.

In other embodiments, the damper unit may be transported to and mounted at a mounting position that is arranged inside the bottom half of the tower section.

In an embodiment, mounting the damper unit comprises mounting the damper unit at a mounting position inside the tower section such that the damper unit is mounted in a lower half of the tower section at the mounting position. Lower half in this respect refers to the half of the tower located below a plane that is defined by a central longitudinal axis of the tower section (e.g. cylinder axis or cone axis) and a horizontal axis that is perpendicular thereto when the tower section is arranged in the horizontal orientation (i.e. lying on its side). In particular, more than 60% of the volume, more than 70% or even more than 80% of the volume of the damper unit may be disposed in this lower half of the tower section. A respective fraction of the weight of the damper unit may be disposed in the lower half of the tower section.

By mounting the damper unit in the lower half of the tower section, the mounting can occur without the load having to be suspended above ground. Health and safety risks for the persons performing the mounting operation can thus be reduced. Furthermore, the center of gravity of the horizontally oriented tower section can be kept close to ground. The damper unit has a significant weight, and plural damper units may be installed. Installation of the damper units in the upper half may thus shift the center of gravity to a position above the central longitudinal axis of the tower section, so that the tower section may tend to roll and become instable. Such tendencies can be avoided by mounting the damper unit in the lower half of the tower section. Transport of the tower section on the road and by boat can thus be made safer, in particular as tendencies to roll over as well as imbalances are reduced.

In an embodiment, the method further comprises, prior to transporting the damper unit to a position inside the tower section, installing a ladder module in the tower section and rotating the tower section by about 180 degrees (i.e. upside down) around its longitudinal axis so that ladder module is arranged in an upper part of the tower section. The ladder module, or ladder elements, may for example be installed on the 'floor' of the tower section when the tower section is arranged horizontally, which facilitates installation thereof. By rotating the tower by 180 degrees, the damper unit can similarly be installed in the lower half of the tower section, thus improving safety of the assembly personnel and improving the weight distribution of the tower section.

The tower section may be the top section of the wind turbine tower. The method may further comprise transporting the tower section from an assembly site at which the damper unit is mounted to the tower section to a wind turbine installation site, bringing the tower section into a vertical orientation, and mounting the tower section on top of a second tower section of the wind turbine tower. A wind turbine tower that comprises the tower section including the damper unit may benefit from improved damping characteristics. In particular, the method allows the mounting of one or more heavy damper units at any desired position inside the tower section so that tower movement and oscillations can be damped efficiently.

According to a further embodiment of the present invention, a horizontal transport system for assembling a tower section of a wind turbine tower is provided. The horizontal transport system is configured to be supported at least at one position by the tower section and comprises a movable part configured to support a damper unit and to transport the damper unit in a horizontal direction from a position adjacent to an end of the tower section to a position at or adjacent to a mounting position of the damper unit inside the tower section while the tower section is arranged in a horizontal orientation. By means of such transport system, advantages similar to the ones outlined further above may be achieved. In particular, by such transport system, the damper unit may be transported a significant distance into the tower section so that it can be mounted at any desired location within the tower section. Further, such transport system allows the introduction of the damper unit through either end of the tower section irrespective of the mounting position. Thus, a damper unit may be introduced from the bottom end of the tower section even though it is to be mounted close to the top end of the tower section.

The horizontal transport system is in particular provided for transporting the damper unit to the mounting position inside the tower section. It may include a guide to guide the movable part along the horizontal direction.

The movable part may for example be a trolley that is configured to support the damper unit. The trolley is movable to transport the damper unit in the horizontal direction to the position, in particular to the mounting position.

As mentioned above, the trolley can be supported by wheels running on inner wall of the tower section, or the horizontal transport system may comprise a rail, wherein the trolley is running on the rail. The rail may thus provide a guide that guides the trolley in the horizontal direction.

The rail may be a bottom rail disposed in a lower part of the tower section when the tower section is in the horizontal position (i.e. in the lower half of the tower section, in particular on the wall of the tower section that faces the ground). The trolley may then be configured such that the damper unit can be placed on top of the trolley. The damper unit may for example be lifted with a crane or telescope handler on top of the trolley which can then be sled into the tower section.

The trolley can comprise a turn table to rotate the damper unit when it is supported by the trolley. In particular hydraulic turn table may be provided. Rotation of the damper unit inside the tower section is thus facilitated.

In another embodiment, the rail may be a beam disposed in an upper part of the tower section when the tower section is in the horizontal position (i.e. in the upper half). The trolley is configured such that the damper unit is suspended from the trolley, for example by a respective harness or carrying frame. The trolley may thus correspond to a crane trolley or travelling carriage, which slides or rolls along a beam.

The beam may in particular be supported by a flange at the respective end of the tower section through which the damper unit is introduced into the tower section, by one or more legs supported inside the tower section, by one or more legs supported outside the tower section, from an overhead wall section of the tower section, or by a combination thereof. A stable transport system can thus be achieved that allows transportation of the damper unit to any desirable position inside the tower section.

The trolley may be or may comprise a hoist allowing the raising and lowering of the damper unit suspended therefrom.

In an embodiment, the transport system further comprises a hauling rope (for example a metal wire) by means of which the trolley can be pulled into the tower section. The transport system may further comprise a pulley disposed at the end of a guide or at the end of a rail. The pulley is configured to change the direction of the hauling rope so that by pulling the hauling rope out of one end of the tower section, the trolley is moved into the tower section from the same end of the tower section.

According to a further embodiment, a system comprising the tower section in the horizontal orientation and the transport system in any of the disclosed configurations is provided.

According to a further embodiment of the invention, a tower section of a wind turbine tower of a wind turbine is provided. The tower section comprises a damper unit, wherein the damper unit is configured to damp motions of the wind turbine tower. The damper unit is mounted in the tower section at a mounting position, wherein the mounting position is located at a distance of at least 4 meters from either end of the wind turbine tower section. Such tower section may be provided as a result of the above mentioned assembly method and may be obtained by employing the above described transport system. In particular, the damper unit may be positioned inside such tower system at positions that are further away from the tower section ends, so that improved damping effects can be achieved.

The distance between the damper unit (in particular its center of mass) and each end of the tower section is at least 6 m, more at least 8 m or even 10 m or more.

The weight of damper unit may be at least 6 tons, at least 7 tons, more at least 8 or at least 10 tons. A significant damping of tower motions due to dynamic loads may thereby be achieved.

The damper unit may have a longitudinal extension that extends in a cross sectional plane of the tower section, wherein the longitudinal extension is at least 70%, at least 80% or 85% of the inner diameter of the tower section at the mounting position. In particular, the longitudinal extension may be larger than a diameter of an opening at the top end of the tower section (in particular of a conical section). With the assembly method and assembly system described herein, the mounting of such large damper unit in a respective tower section is made possible.

The damper unit may be sized and arranged such that when the tower section is divided into two halves along its central longitudinal axis, more than 60% of the volume of the damper unit is located in a first half of the two halves (in the lower half of the tower section when the tower section is in the horizontal orientation). More than 70% or even more than 80% or 90% of the volume or weight of the damper unit may be located in the first half. In such configuration, sufficient space is left in the other half of the tower section for further equipment, such as a ladder, cabling and the like.

The damper unit may be shaped such that at least a circle segment corresponding to a quarter of the inner cross sectional area of the tower section at the mounting position is not occupied by the damper unit. The circular segment may corresponding to even ⅓ of the cross sectional area at the mounting position. Sufficient space is thus provided for a ladder, which can be attached inside the tower section to the outer shell of the tower section.

In any of the above described embodiments, the damper unit may comprise at least one damper element in form of a slosh damper. The slosh damper is filled with damping medium prior to being mounted to the tower section. Assembly of the tower section is thus facilitated, since a later filling of the damper element may not be possible without significant efforts.

The damper unit may comprise or consists of a first and a second damper element which are fixed to each other. The damper unit can include a respective frame for fixing the damper elements to each other. Each damper element has a cylindrical shape. Both damper elements are of the same size. In other embodiments, the damper unit may comprise only a single damper element or may comprise three or more damper elements.

For example, the damper unit may comprise or consists of a first and a second damper element having a cylindrical shape and being mounted laterally next to each other in a frame such that the height axes of both cylindrical shapes are substantially parallel to the longitudinal axis of the tower section. An efficient weight distribution may thus be achieved.

The frame may comprises an upper cross beam fixing the first and second damper elements to each other at an upper side thereof and may further comprises a lower cross beam fixing the first and second damper elements to each other at a lower side thereof. In this respect, upper and lower sides refer to the side of the damping elements facing upwards or downwards when the wind turbine tower including the tower section is erected. The cross beams may be adapted to be mounted to an inner surface of an outer wall or shell of the tower section. The cross beams may define the longitudinal extension of the damper unit. They may be disposed so as to run through the cylinder axes of both cylindrical damper elements.

In an embodiment, the tower section comprises plural damper units that are mounted in the tower section adjacent to each other in the longitudinal direction of the tower section. A desired damping effect may thus be achieved by distributing plural damping units along the tower section. One, two, three or more damper units are provided in the tower section.

It is to be understood that the features mentioned above and those yet to be explained below can be used not only in the respective combinations indicated, but also in other combinations or in isolation, without leaving the scope of embodiments of the present invention. In particular, the assembly method may make use of the transport system in any of the configurations described herein and may further be adapted to assemble a tower section in any of the configurations described herein. Likewise, the tower section and the transport system may have any of the configurations described herein with respect to embodiments of the assembly method.

BRIEF DESCRIPTION

Some of the embodiments will be described in detail, with references to the following Figures, wherein like designations denote like members, wherein.

DETAILED DESCRIPTION

Figure 1:
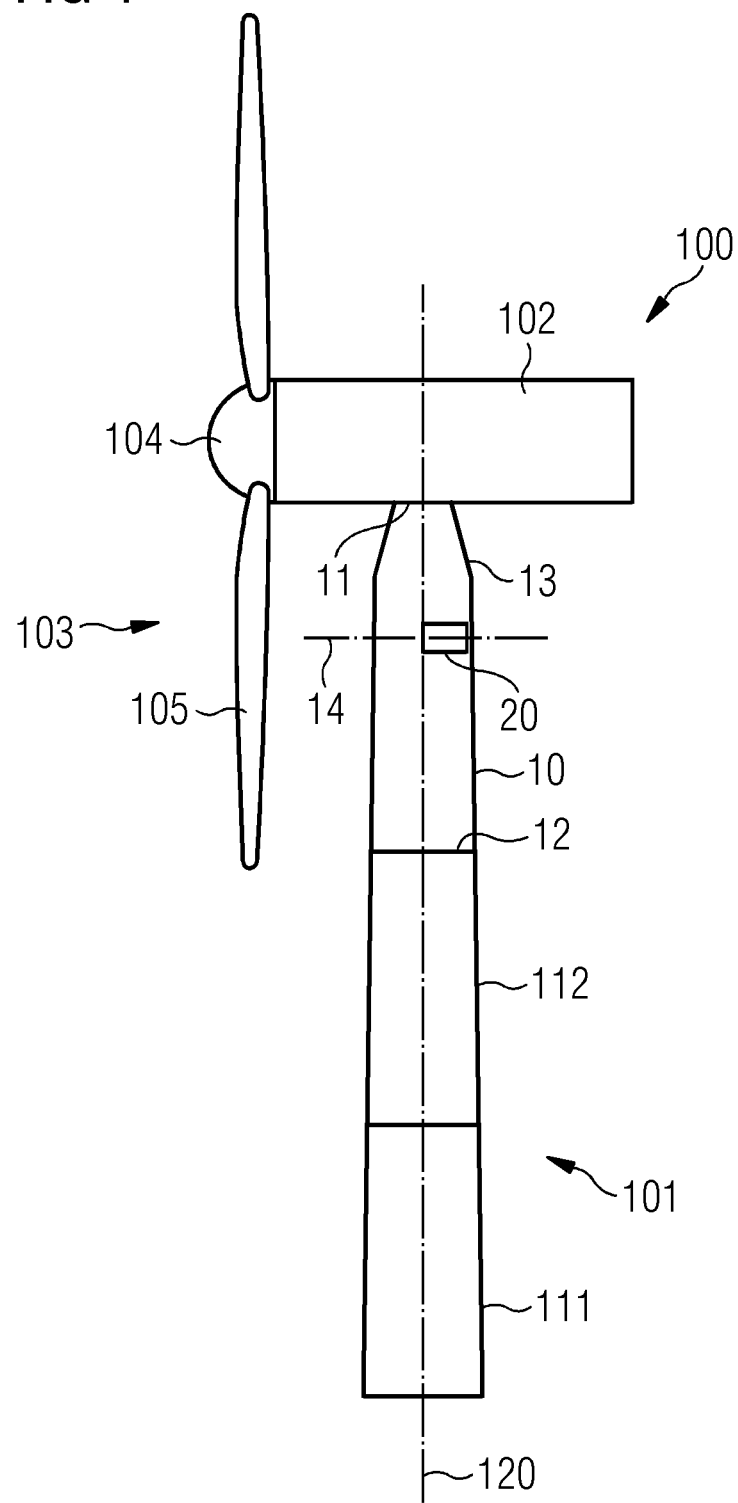
FIG. 1 is a schematic drawing showing a wind turbine comprising a tower section according to an embodiment of the invention.

In the following, embodiments of the invention will be described in detail with reference to the accompanying drawings. It is to be understood that the following description of the embodiments is given only for the purpose of illustration and is not to be taken in a limiting sense. It should be noted that the drawings are to be regarded as being schematic representations only, and elements in the drawings are not necessarily to scale with each other. Rather, the representation of the various elements is chosen such that their function and general purpose become apparent to a person skilled in the art.

FIG. 1 shows a wind turbine 100 that includes a wind turbine tower 101 on which a nacelle 102 is mounted. A rotor 103 of the wind turbine 100 includes a hub 104 and rotor blades 105. The hub 104 is rotatably coupled to the nacelle 102. Wind energy is transformed into rotation and thus into mechanical energy by the blades 105. A generator is directly connected to the rotor (direct drive wind turbine) or is connected to a rotor shaft via a gearbox. The general function and configuration of such wind turbine is generally known and is thus not described in greater detail here.

The wind turbine tower 101 includes plural tower sections, for example 2, 3, 4 or more tower sections. In the example of FIG. 1, tower sections 111 and 112 as well as a tower section 10 are provided. Tower section 10 is a top section onto which the nacelle 102 is installed, for example via a yaw system to adjust the orientation of the nacelle 102 and thus of rotor 103. The tower section 10 includes a top end 11 and a bottom end 12. Close to the top end 11, the tower section 10 has a conical section 13. The longitudinal direction, in particular a central longitudinal axis, of the wind turbine tower 101 and thus of the respective tower sections is indicated at reference sign 120. In FIG. 1, the wind turbine tower 101 is erected and the tower sections are oriented in the vertical direction.

The tower section 10 comprises a damper unit 20 that is installed inside the tower section 10. The damper unit 20 is installed in the top half of the tower section 10, i.e. towards the conical section 13. The mounting position in the longitudinal direction of the tower section 10 is indicated with reference sign 14. In other configurations, one or more damper units 20 may be installed at different positions along the longitudinal direction of the tower section 10. In the following, several methods of mounting the damper unit 20 to the tower section 10 are described in accordance with embodiments of the invention.

Figure 2:
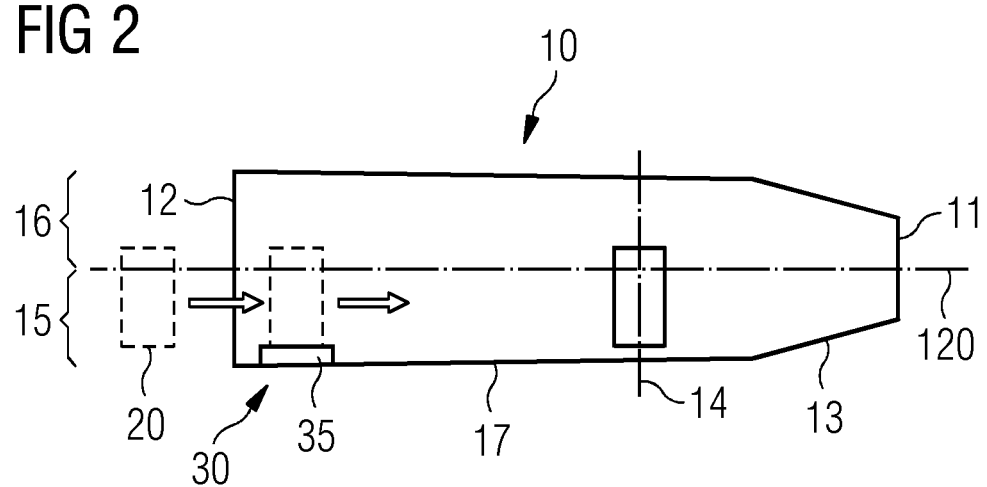
FIG. 2 is a schematic drawing showing the assembly of a tower section in accordance with an embodiment of the invention.

As shown in FIG. 2, for assembling the tower section 10, the tower section 10 is brought into a horizontal orientation. The tower section may be simply disposed on the ground of a working area using respective supports. The longitudinal axis 120 of tower section 10 can be substantially parallel to the earth surface. It should be clear that as the tower section 10 may have a decreasing diameter over its length, the longitudinal axis 120 will generally slightly deviate from the horizontal direction. Alternatively, the tower section 10 can be supported on supports of varying height to ensure that the axis 120 is parallel to the horizontal direction.

In FIG. 2, a horizontal transport system 30 according to an embodiment is provided inside the tower section 10. The transport system 30 is configured to move the damper unit 20 from one end of the tower section (here the bottom end 12) to the mounting position 14 (or at least adjacent to such position) at which the damper unit 20 is mounted to the tower section 10.

In the example of FIG. 2, the transport system 30 includes the trolley 35. The trolley 35 is supported by the shell 17 of the tower section 10, in particular by a wall section facing downwards.

In other embodiments, the trolley 35 can be supported by a rail or beam, as described further below. Trolley 35 can have wheels that roll on an inner surface of the outer shell 17 of tower section 10.

When assembling the tower section 10, the damper unit 20 is placed onto the trolley 35, for example by means of a hoist, crane, loader or the like. The trolley including the damper unit 20 is then moved to the mounting position 14. As can be seen, the trolley is moved in a substantially horizontal direction along the longitudinal extension of the tower section 10. At the mounting position 14, the damper unit 20 is mounted to the tower section 10, in particular to its outer shell 17. It may for example be fastened thereto using bolts or the like.

By mounting the damper unit 20 in such way, it is possible to mount the damper unit 20 at essentially any position in the longitudinally direction of the tower section 10. Even if the damper unit 20 has significant weight, for example 8 t or more, it can be moved to any position within the tower section 10.

The tower section 10 is divided by a substantially horizontal plane that includes the central longitudinal axis 120 into an upper half 16 and a lower half 15. As can be seen in FIG. 2, at the mounting position 14, most of the volume of the damper unit 20 is arranged in the lower half 15. The damper unit 20 is thus not suspended high above the ground (inner surface of outer shell 17). The risk associated with mounting the damper unit 20 to the tower section 10 is thus reduced compared to situations in which the damper unit 20 is for example mounted to the upper half 16 of the tower section 10. This is a significant advantage in view of the considerable weight of the damping unit 20.

Furthermore, it can be seen that the center of mass has shifted below the longitudinal axis 120 when mounting the damper unit 20 at such position. Accordingly, the tower section 10 is stabilized in the horizontal position and its tendency to roll around the longitudinal axis 120 is significantly reduced. Contrary, mounting the damper unit 20 in the upper half 16 would result in a higher center of mass and in the tendency of the tower section 10 to roll. This can cause significant problems during transport and storage of the tower section 10.

Damper unit 20 is a slosh damper. It is in particular filled with a damping medium that dissipates energy when moving around in cavities provided in damper unit 20. The damper unit is already filled with the damping medium prior to installating, as a later filling of the damper unit is impractical. The damper unit can for example comprise 1, 2, 3, 4 or more damper elements of cylindrical shape. Two cylindrical damper elements are provided and are attached to each other by means of a frame.

Figure 3:
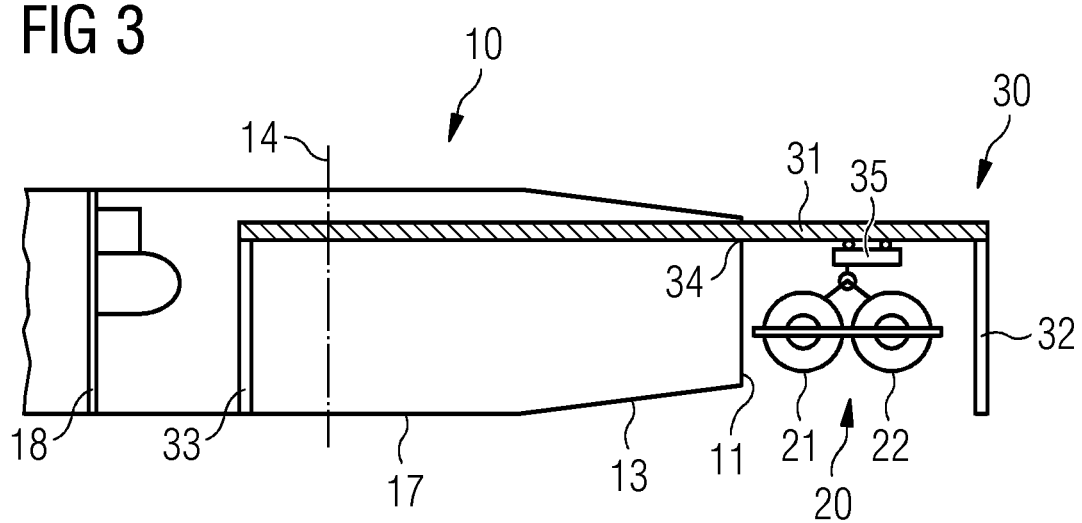
FIG. 3 is a schematic drawing showing an assembly of a tower section in accordance with an embodiment of the invention.

In FIG. 3, a damper unit 20 that includes two cylindrical damper elements 21, 22 is shown. Further, FIG. 3 illustrates a transport system 30 that includes a rail 31 which is implemented as a beam reaching from outside the tower section 10 to inside the tower section 10, in particular to the mounting position 14. The trolley 35 runs on the rail 31. The trolley may for example have wheels that run on the beam, similar to a crane trolley or travel carriage. The transport system 30 is supported by the tower section 10, and may further be supported outside the tower section 10.

In the example of FIG. 3, a first support 32 supports the transport system 30, in particular the rail 31, outside the tower section 10. The first support 32 is provided by a leg or a pair of legs, but may have a different configuration. In the tower section 10, the transport system 30 is supported by a second support 33, which again may be implemented as a leg or pair of legs that are standing on the shell 17 of the tower section 10. Alternatively, the second support 33 may support the rail 31 from the top (e.g. fastened to the upper part of shell 17), or may be supported by an intermediate platform 18 of the tower section 10 towards which the beam can extend. Further, a third support 34 supports the transport system 30, in particular the rail 31, at a flange 19, 50 at an end of the tower section 10. The rail may for example be fastened to the flange by using a bracket, bolts or the like. Support 34 may only be temporary, for example when inserting the rail/beam into the tower section 10, or it may support the rail/beam also during transport of the damper unit 20. In the example of FIG. 3, it is the flange at the top end 11 that provides the support, but it may as well be the flange at the bottom end 12, in particular when the damper unit 20 is inserted through the bottom end 12 of the tower section 10.

It should be clear that in some configurations, the transport system 30 may only comprise the support 33 or the support 34. In particular, a support 32 outside the tower section 10 is optional.

Figure 4:
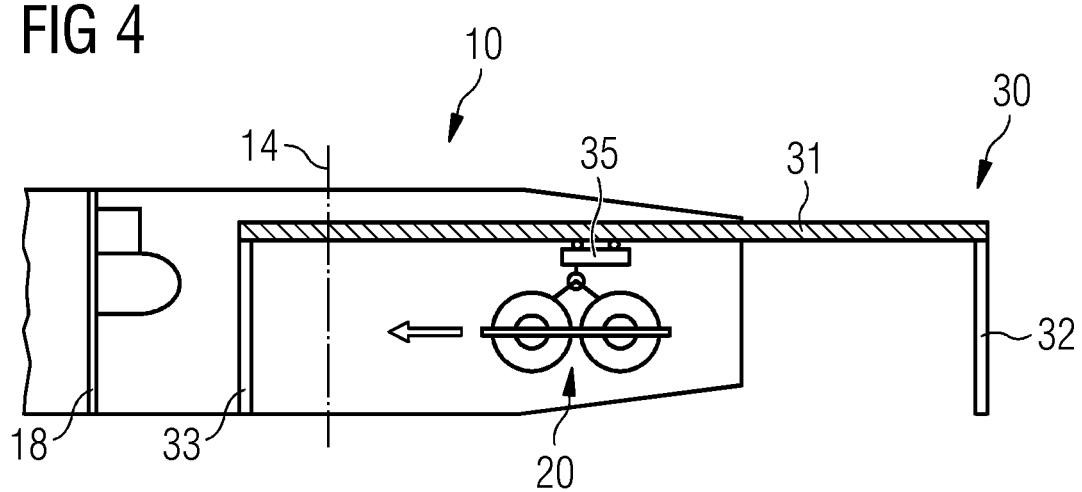
FIG. 4 is a schematic drawing showing the assembly of a tower section in accordance with an embodiment of the invention.
Figure 5:
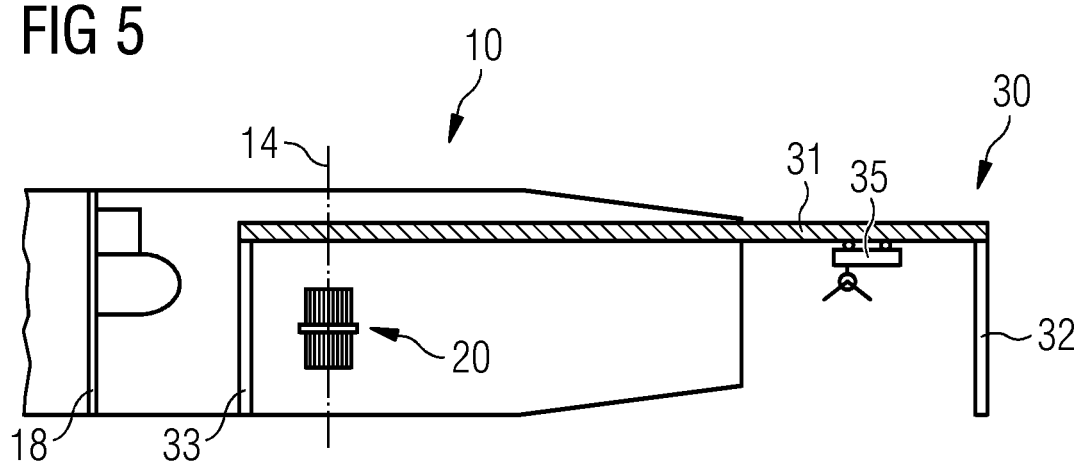
FIG. 5 is a schematic drawing showing the assembly of a tower section in accordance with an embodiment of the invention.

With respect to FIGS. 3 to 7, an assembly method according to an embodiment of the invention is described. As illustrated in FIG. 3, the damper unit is suspended from the trolley 35. The trolley 35 may for example comprise a hoist for lifting the damper unit 20, or a crane or the like may be used for transporting the damper unit to a position in which it can be fixed to the trolley 35. Trolley 35 is then moved along the rail 31 towards the mounting position 14, as shown in FIG. 4. At some position inside the tower section 10, the damping unit 20 is rotated, which will be explained in more detail further below. When the damper unit 20 has reached the mounting position 14, it is mounted to the tower section 10. The trolley 35 can then be moved out of the tower section 10, for example for receiving a further damper unit 20 to be mounted to the tower section 10. FIG. 5 illustrates the situation in which a first damper element 20 has been mounted to the tower section 10 and the trolley 35 has again been moved to its starting position.

Figure 6:
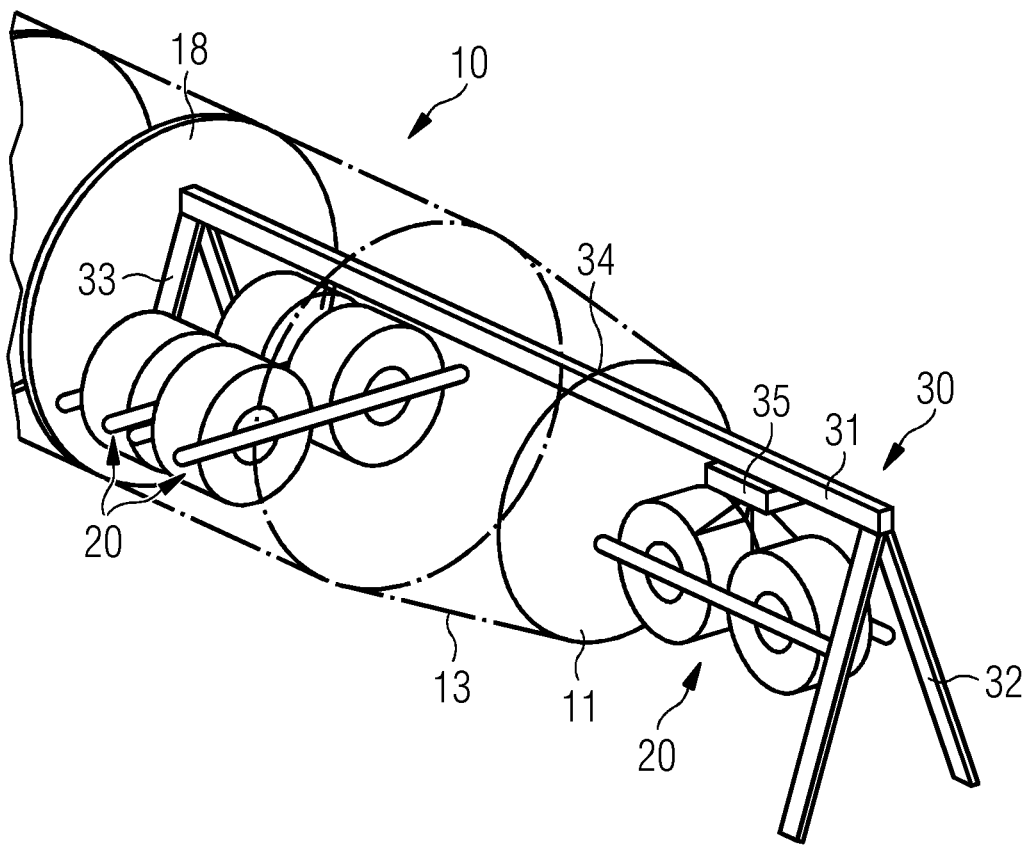
FIG. 6 is a schematic drawing showing the assembly of a tower section in accordance with an embodiment of the invention.

FIG. 6 is a perspective view of the tower section 10 of FIGS. 3-5 showing a situation in which two damper units 20 have been mounted inside the tower section 10 and a third damper unit 20 is suspended from the trolley 35 of the transport system 30. The damper unit 20 suspended from trolley 35 is oriented with its longitudinal direction substantially parallel to the longitudinal direction of the tower section 10 so that it fits through the opening at the top end 11 of the tower section 10. Trolley 35 is moved in a similar fashion into the tower section 10, the third damper unit 20 is rotated and is mounted to the tower section 10 at its mounting position, which is different from the mounting position of the first and second damper units.

Figure 7:
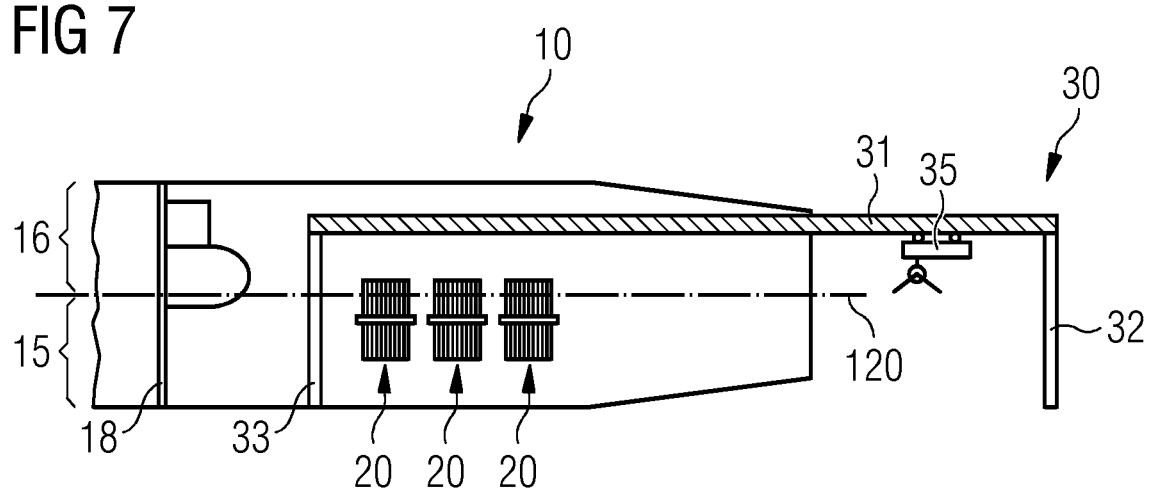
FIG. 7 is a schematic drawing showing the assembly of a tower section in accordance with an embodiment of the invention.

FIG. 7 shows the situation after the third damper unit 20 has been mounted to the tower section 10 and the trolley has again been moved to the outside. The transport system 30 can now be disassembled and the tower section 10 can be transported to the installation site at which the wind turbine is to be erected. It should be clear that in other embodiments, only one or two damper units may be installed, or that more than three damper units may be installed.

As the transport system 30 and the assembly method described with respect to FIGS. 3 to 7 are only a modification of the system and method of FIG. 2, the above explanations are equally applicable to the system and method described with respect to FIGS. 3 to 7. As shown in FIG. 7, most of the volume and of the weight of the damper units 20 is disposed in the lower half 15 of the tower section 10, leading to the advantages outlined above.

Figure 8:
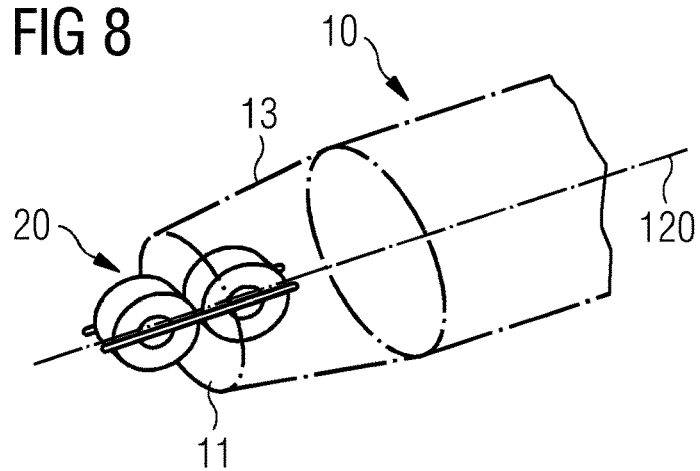
FIG. 8 is a schematic drawing showing a rotation of a damper unit inside a tower section in accordance with an embodiment of the invention.
Figure 9:
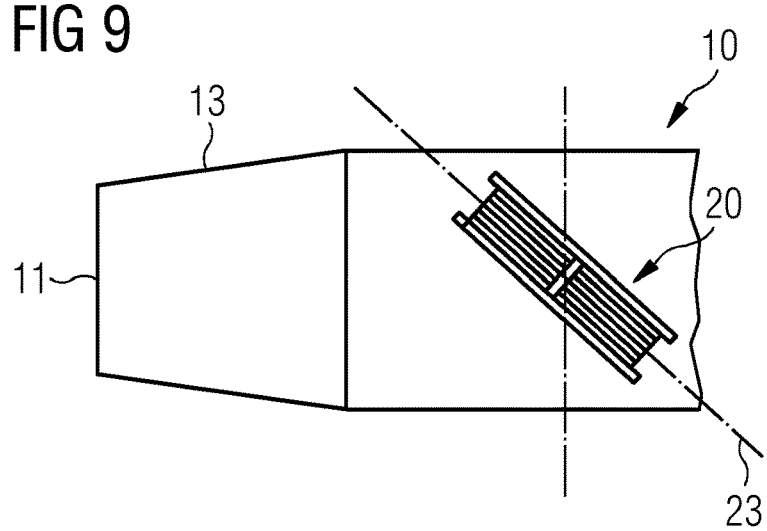
FIG. 9 is a schematic drawing showing the rotation of a damper unit inside a tower section in accordance with an embodiment of the invention.
Figure 10:
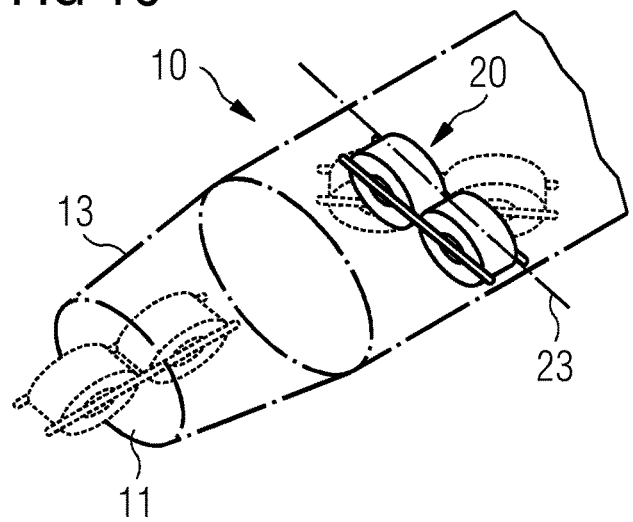
FIG. 10 is schematic drawing showing the rotation of a damper unit inside a tower section in accordance with an embodiment of the invention.

In FIGS. 8 to 10, rotation of the damper unit 20 is illustrated. In particular, the damper unit 20 has an extension along its longitudinal direction 23 that is larger than the diameter at the opening in the top end 11 of the tower section 10. The same may apply to the bottom end 12, where a mounting flange for attaching the tower sections to each other may reduce the size of a respective opening. The size of the damper unit 20 in its longitudinal direction may for example be larger than 70%, 80% or even 85% of the inner diameter of the tower section 10 at the mounting position 14 to make good use of the space available inside the tower section 10.

Prior to moving the damper unit 20 into the tower section 10, the damper unit 20 is thus rotated such that its longitudinal direction 23 is substantially parallel to the longitudinal direction 120 of the tower section 10 and to the direction of travel. It does not need to be exactly parallel—the purpose of rotating the damper unit 20 is that the damper unit 20 fits through the opening in the respective top or bottom end 11, 12 of the tower section 10. The rotated position of the damper unit 20 is illustrated in FIG. 8. After rotation, the damper unit is moved into the tower section 10. When located in the tower section 10, the damper unit 20 is rotated such that its longitudinal axis 23 is substantially perpendicular to the longitudinal axis 120 of the tower section 10, as shown in FIG. 9. Rotation can occur at any suitable position inside the tower section 10; it may occur shortly behind the conical section 13 or close to or at the mounting position 14. FIG. 10 illustrates the situation in which the damper unit 20 has been rotated and moved into its final position and has been mounted to the tower section 10. Such method of transporting the damping unit 20 into the tower section 10 can be used in combination with any of the assembly methods disclosed herein. It is in particular not limited to any particular configuration of the transport system 30.

FIGS. 11 to 14 show a transport system according to a further embodiment of the invention. The transport system is a modification of the above described transport systems, so that above explanations are equally applicable to the transport system and assembly method of FIGS. 11 to 13.

Figure 11:
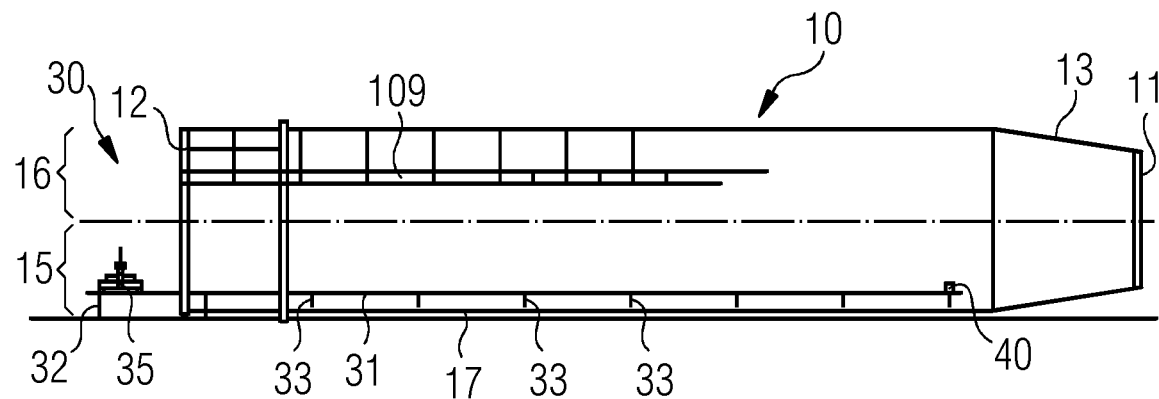
FIG. 11 is a schematic drawing showing a transport system according to an embodiment of the invention.

The transport system 30 shown in FIG. 11 includes a rail 31 and a trolley 35. The rail 31 is disposed in the lower half 15 of the tower section 10. In particular, it is supported in the tower section 10 by the outer shell 17 of the tower section 10. The transport system 30 comprises a first support 32 that supports the transport system 30, in particular the rail 31, outside the tower section 10. The first support 32 is provided by a leg or a pair of legs, but may have a different configuration. In the tower section 10, the transport system 30 is supported by one or more second supports 33, which again may be implemented as a leg or pair of legs that are standing on the shell 17 of the tower section 10. The second supports 33 are distributed along the longitudinal direction of the tower section 10 so that the rail 31 is sufficiently supported and is capable of carrying the weight of the damper unit 20.

In the example of FIG. 11, the rail 31 extends out of the tower section 10. In other embodiments, the rail may only extend inside the tower section 10. In FIG. 11, a ladder module 109 is further visible. The ladder module 109 is mounted in the upper half 16 of the tower section 10. If the damper until 20 is mounted in the lower half 15 of the tower section 10, there is sufficient space for leading the ladder module 109 past the damper unit 20 inside the tower section 10. The ladder module 109 may be present in any of the embodiments described herein. It may be mounted to the tower section 10 while the tower section 10 is oriented horizontally yet disposed upside down, i.e. with the upper half 16 facing downwards, as described in more detail further below.

Figure 12:
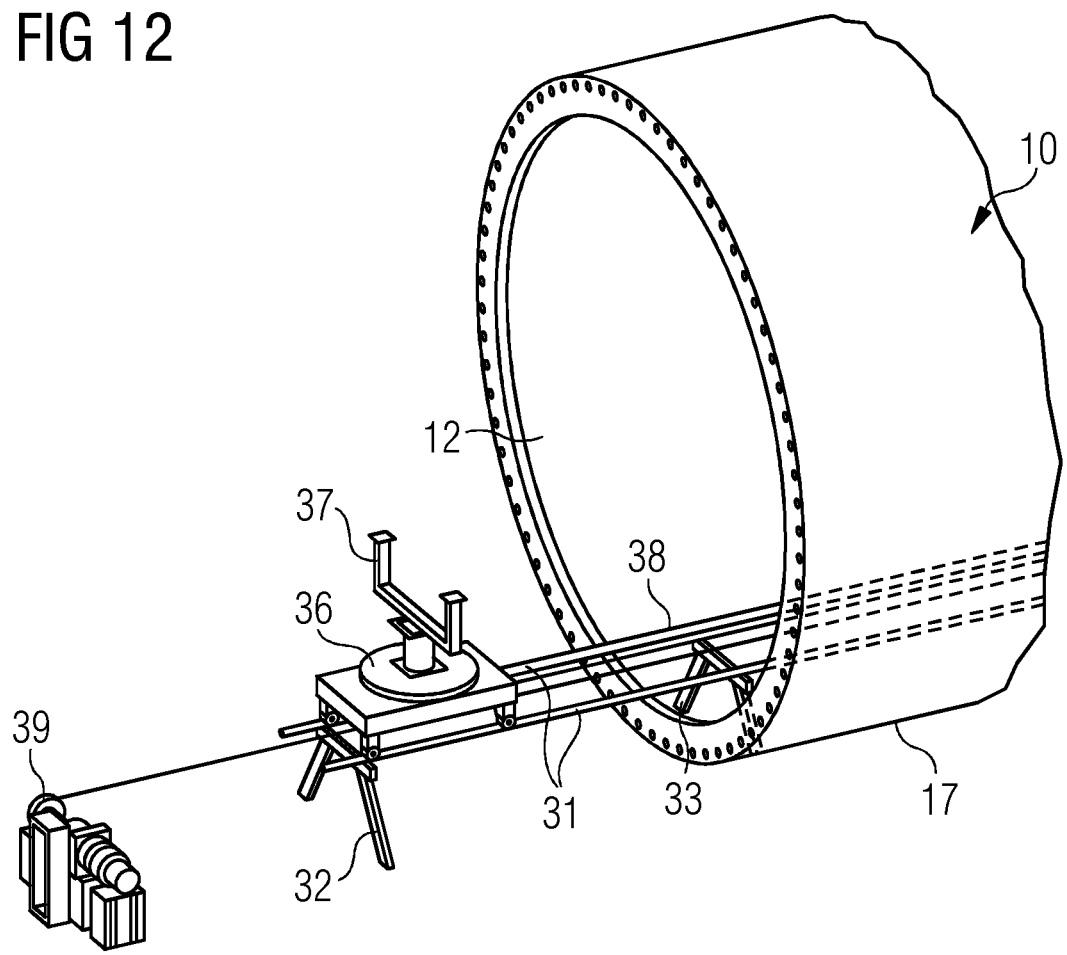
FIG. 12 is a schematic drawing showing a trolley of a transport system according to an embodiment of the invention.

FIG. 12 shows a close up view of the trolley 35. As can be seen, the trolley comprises a turn table 36 which can be hydraulically operated. The turn table 36 allows rotation of the damper unit 20 when the damper unit 20 is positioned on the trolley 35. For securing the damper unit 20 on the trolley 35, the trolley 35 further comprises a mount 37, which has the shape of a bracket, but may have any other shape suitable for the respective damper unit 20.

In the example of FIG. 12, the rail 31 comprises two U-profiles on which the trolley 35 runs. The trolley 35 is equipped with respective wheels which run in the U-profiles. In other embodiments, the rail 31 may comprise two bars, and the wheels of the trolley 35 may be notched to prevent the trolley from leaving the bars.

Figure 13:
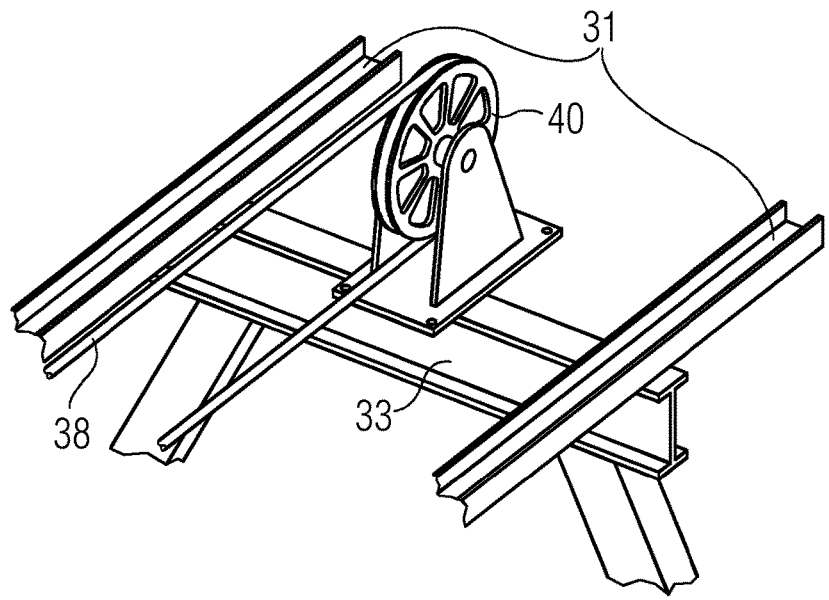
FIG. 13 is a schematic drawing showing a pulley of a transport system according to an embodiment of the invention.

The trolley is attached to a hauling rope 38, for example to steel wire. The trolley 35 can be moved by pulling the hauling rope 38. To allow operation from one end of the tower section 10, a pulley 40 is provided at the end of rail 31 that reverses the direction of the hauling rope 38 (FIG. 13). A winch 39 can be provided inside or outside the tower section 10 to haul in the hauling rope 38 and to thereby move the trolley 35 into the tower section 10. Alternatively, the hauling rope 38 may be pulled out of the other end of the tower section 10.

Figure 14:
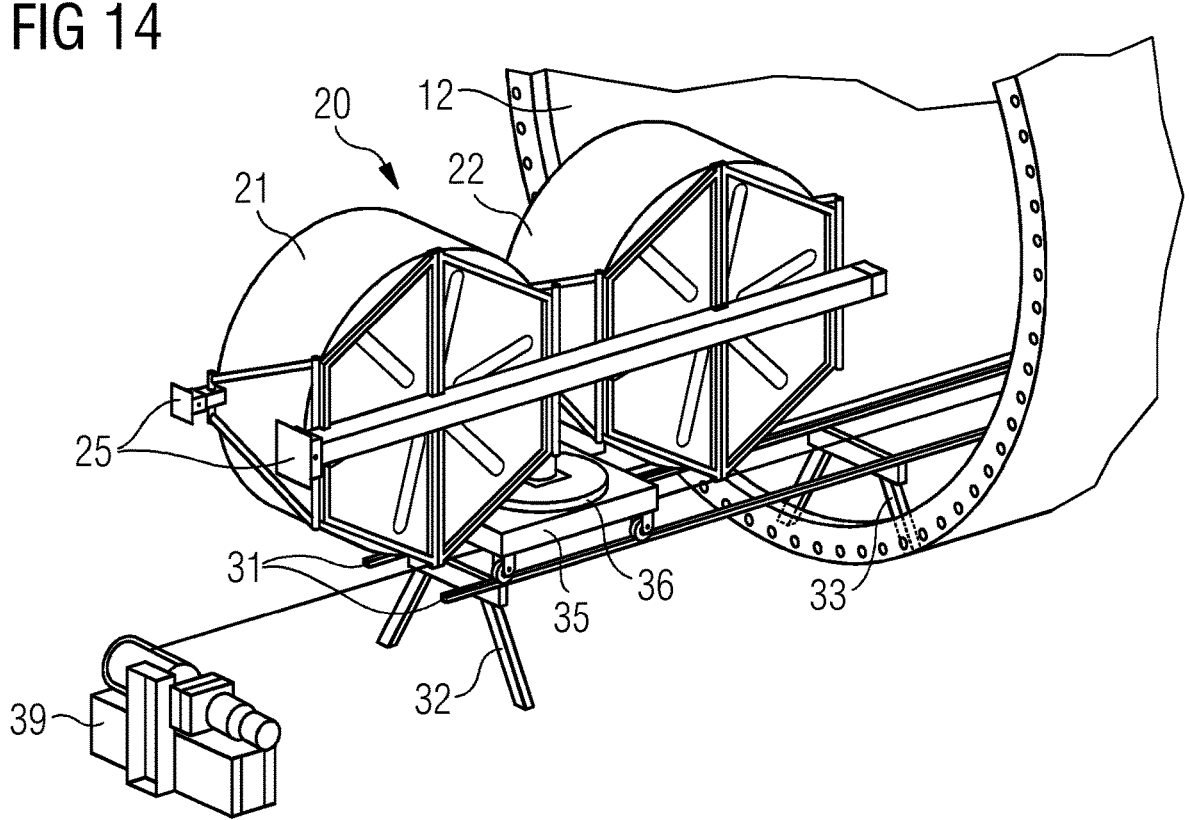
FIG. 14 is a schematic drawing showing a damper unit disposed on as trolley of a transport system according to an embodiment of the invention.

FIG. 14 shows the situation in which the damper unit 20 is placed on the trolley 35. The damper unit 20 may be lifted by a hoist, a crane or the like onto the trolley 35 any may be held in place by the mount 37. As described above, the damper unit can be oriented with its longitudinal direction 23 parallel to the transport direction. Thereby, the damper unit 20 can be fitted easily into the tower section 10 even though a flange 50 at the bottom end 12 restricts the opening leading into the tower section 10.

In FIG. 14, it is further shown that the damper unit 20 can include two damper elements 21, 22 that are secured to each other by means of a frame 25. The frame 25 can for example include two cross beams, one on each end face of the cylindrical damper elements 21, 22. The two beams fix the two damper elements to each other. The beams are configured such that they provide a mounting structure for mounting of the damper unit to the tower section 10, in particular to an internal surface of the outer shell 17, for example using brackets or bolts. The ends of the beams may for example be shaped so as to be introduced into brackets mounted to the outer shell. After placing the damper unit 20 on the trolley 35, the winch 39 is operated to pull the trolley and the damper unit 20 into the tower section 10. When the damper unit 20 is located inside the tower section 10, the turntable 36 is operated to rotate the damper unit 20 into the orientation required for mounting, as described above with respect to FIGS. 8 to 10. If not already located at the mounting position, the trolley is then moved by actuation of the winch to the final mounting position. The damping unit 20 is then mounted to the tower section 10, in particular to its outer shell 17, e.g. by fixing the cross beams thereto.

As mentioned above, further damper units 20 can be mounted inside the tower section 10. The transport system 30 allows the mounting of the damper unit 20 at essentially any desired position inside the tower section 10. In particular, the damper unit 20 can be mounted close to the conical section 13 at the top end 11, even though it is introduced through the bottom end 12.

Figure 15:
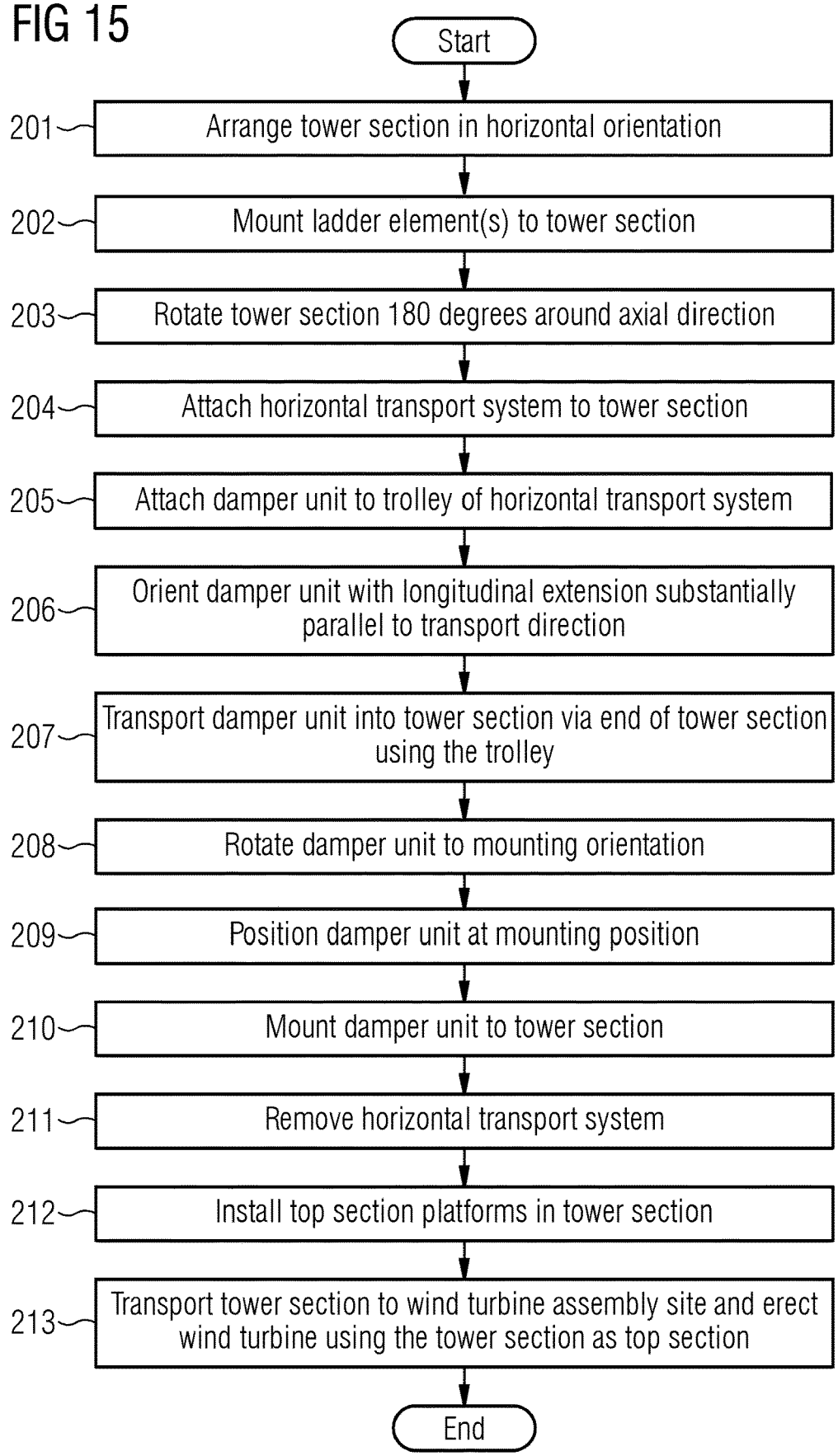
FIG. 15 is a schematic drawing showing a flow diagram of a method according to an embodiment of the invention.

FIG. 15 is a flow diagram of a method of assembling a tower section in accordance with an embodiment of the invention. The method may be performed in accordance with any of the variations described above, in particular by employing a transport system in any of the above described configurations.

In step 201, the tower section 10 is arranged in a horizontal direction, as for example shown in FIG. 2, 3 or 11. In step 201, a ladder module, which may comprise several ladder elements, is mounted to the tower section 10. As overhead mounting of the ladder module is generally not feasible, the ladder module is mounted inside the tower section 10 to the part of the outer shell 17 facing the ground. The ladder module 109 can thus simply be positioned inside the tower section 10 and fastened thereto.

In step 203, the tower section 10 is rotated around its longitudinal axis 120 (i.e. about its axial direction) by about 180 degrees so that the ladder module is disposed in the upper half 16 of the tower section 10, as shown in FIG. 11. In step 204, the horizontal transport system 30 is mounted to the tower section 10. This may for example occur by disposing the trolley 35 inside the tower section 10, by supporting a rail 31 in form of a beam inside the tower section 10, as shown in FIG. 3, or by supporting a rail 31 in the lower half 15 of the tower section 10, as shown in FIG. 11. As outlined above, variations are possible, for example with respect to the end of the tower section 10 into which the transport system 30 is introduced, the number and placement of supports for the rail 31 and the like.

In step 205, the damper unit 20 is attached to the trolley 35. It is for example disposed on the trolley and fastened thereto, or it is suspended from the trolley. The damper unit can be attached to the trolley in such way that its longitudinal axis is pointing in the direction of travel, i.e. is substantially parallel to the longitudinal direction of the tower section 10 (step 206).

In step 207, the damper unit is transported into the tower section via the respective end 11, 12 of the tower section 10. The trolley can for example be pulled by means of a wire cable, as described with respect to FIGS. 11-14. Alternatively, the trolley 35 or the damper unit 20 may be pushed. When inside the tower section 10, the damper unit 20 is rotated into the mounting orientation in which it is to be mounted, as described with respect to FIGS. 8 to 10 (step 208). Rotation may occur via the turntable. A similar rotating mechanism may be included in the trolley of FIGS. 3-7. Before or after rotation, the damper unit is positioned at the final mounting position (step 209). The damper unit 20 is then mounted to the tower section 10 in step 210. For example, bars of the frame 25 supporting the damper elements 21, 22 may be directly attached to a wall of the tower section 10 using bolts or the like.

In step 211, the horizontal transport system 30 is removed from the tower section 10. The trolley and any rail and supports are for example removed. Further assembly steps can be carried out subsequently, such as the installation of platforms in the tower section 10 in step 212. As the tower section 10 is a top section, respective top section platforms are installed. The sections can be installed by a telescopic handler, as they have a comparatively low weight. It should be clear that prior to or after installing the damper unit 20 in the tower section 10, any additional assembly steps can be performed as required and as are typical for the assembly of a wind turbine tower section, such as the installation of the ladder and the platforms, installation of cable holders, installation of equipment on a platform and the like.

In step 213, the tower section 10 is transported to an installation site of the wind turbine, i.e. to the place where the wind turbine is to be erected. Transport may occur using vehicles and boats. The tower section 10 is generally not rotated again (around its longitudinal axis) when loading the tower section 10 from the assembly site onto a transport vehicle, such as a trailer. As the one or more damper units 20 are mounted in the lower half 15 of the wind turbine tower section 10, tendency of the tower section 10 to roll over is significantly reduced due to the low center of gravity. Imbalances during transport on boats and the rolling or swaying of a trailer during transport on the road may thus be avoided.

The wind turbine tower 101 is for example erected by placing the tower sections 111, 112, 10 on top of each other, wherein section 10 is the top section. Using flanges 50 (FIG. 16), the tower sections are mounted to each other. A yaw system and the nacelle 102 can then be mounted on top of the tower section 10 (see FIG. 1). Accordingly, a safe and efficient way of assembling the tower section 10 and the wind turbine 100 is provided.

It should be clear that several steps of the embodiment of the method illustrated in FIG. 15 are optional, such as steps 202 to 204, 206, 208, and 211-213.

Figure 16:
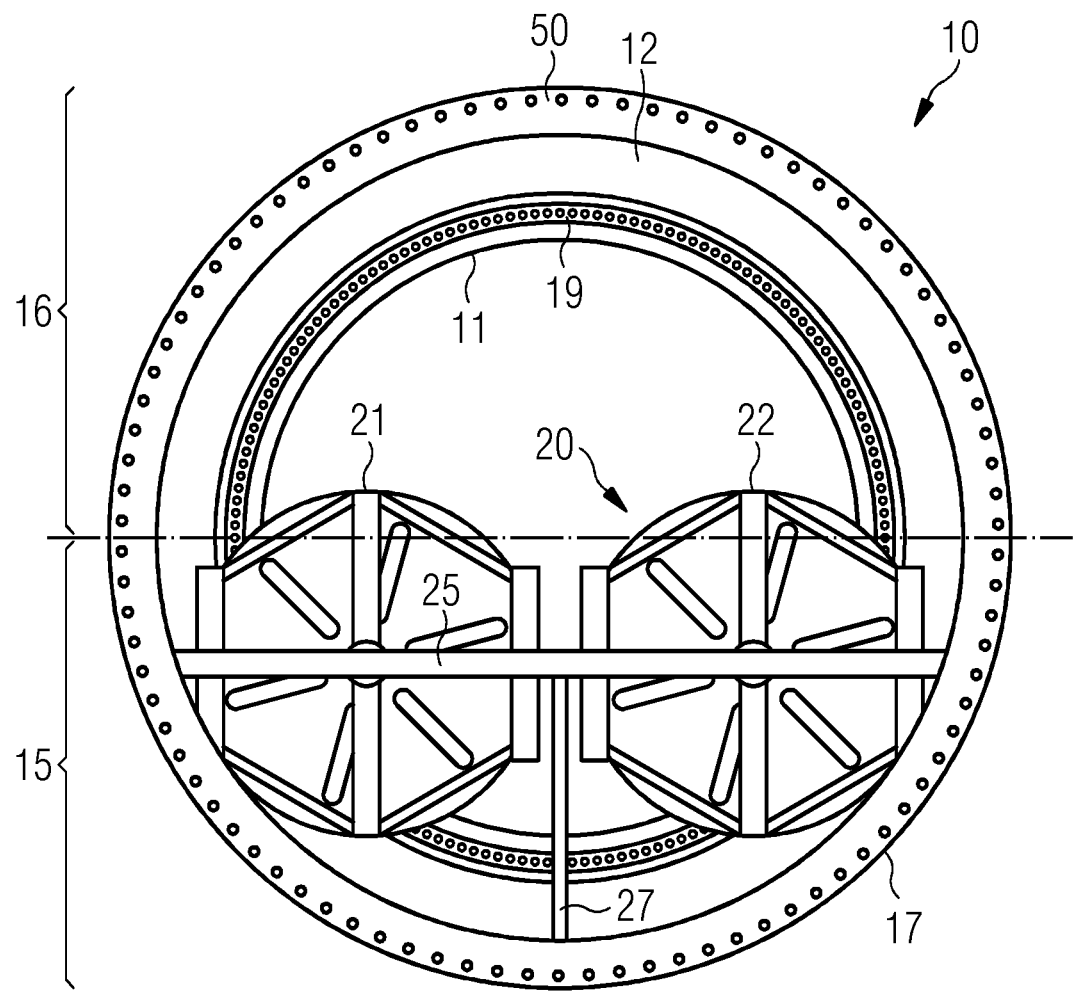
FIG. 16 is a schematic drawing showing a damper unit installed in a tower section according to an embodiment of the invention.

FIG. 16 shows a view from the bottom end 12 of the tower section 10 in which the damper unit 20 is installed. In FIG. 16, the flange 50 at the bottom end 12 and the flange 19 at the top end 11 of the tower section 10 are visible. As can be seen, the longitudinal extension of the damper unit 20 is such that it does not fit through the opening in top end 11 when oriented laterally. The damper unit 20 is mounted to an inner side of the wall or outer shell 17 by means of the frame 25, for example by fastening the cross beams directly to the wall of the tower section 10. Further mounting elements 27 can be provided to ensure a stable and secure attachment to the outer shell 17.

As can be seen in FIG. 16, most of the volume and of the weight of damper unit 20 is arranged in the lower half 15 of the tower section 10. In particular, more than 70%, more than 80%, more more than 90% of the mass of the damper unit 20 is arranged in the lower half 15 of the tower section 10. The dashed line in FIG. 16 indicates a substantially horizontal plane that includes the central symmetry axis in longitudinal direction (the cylinder axis or cone axis) of the tower section 10 and that divides the tower section 10 into the upper half 16 and the lower half 15. As can be seen, in the upper half 16, there is sufficient space available for placement of a ladder and other equipment, such as cables and the like. Since in the cross section at the mounting position, a circle segment of at least 90 degrees, at least 120 degrees is not occupied by the damper unit 20, it is possible to mount equipment to the outer shell 17 of the tower section 10 in this area. By including two cylindrical damper elements 21, 22 in the damper unit 20, the space around the central axis of the tower section 10 can in particular be kept free.

In summary, several advantages are provided by embodiments of the invention. By installing the damper unit in the lower half of the tower section, a low center of gravity of the tower section is achieved. Further, the assembly methods allow the introduction of the large damper unit that comprises two damper elements supported by a double beam frame into the tower section, even though the extension of such structure is generally larger than the width of the end openings of the tower section. The assembly method and transport system allow introduction of the damper unit into the tower section from either side, and the damper unit can be introduced at the bottom end even though it is to be mounted close to the top end of the tower section. Furthermore, damper units having a significant weight, for example 8 t or more, may be installed at any desirable position along the tower section by the assembly methods and the transport systems described herein.

Although the present invention has been disclosed in the form of preferred embodiments and variations thereon, it will be understood that numerous additional modifications and variations could be made thereto without departing from the scope of the invention.

For the sake of clarity, it is to be understood that the use of 'a' or 'an' throughout this application does not exclude a plurality, and 'comprising' does not exclude other steps or elements.

The invention claimed is:

1. A method of assembling a tower section of a wind turbine tower, comprising:
   arranging the tower section of the wind turbine tower in a horizontal orientation;
   transporting a damper unit to a position inside the tower section while the tower section is arranged in the horizontal orientation, wherein the transporting the damper unit comprises:
      orienting the damper unit such that a longitudinal direction of the damper unit is substantially parallel to a horizontal transport direction, and the damper unit is suspended from a movable part attached to a rail of a horizontal transport system at least partially located inside the tower section, such that the damper unit hangs below the rail,
      moving the movable part with the damper unit suspended therefrom along the rail in the horizontal transport direction through the tower section to the position inside the tower section, and
      rotating the damper unit while the damper unit is suspended from the movable part located inside the tower section until the longitudinal direction is substantially perpendicular to the horizontal transport direction; and
   mounting the damper unit to the tower section, wherein the damper unit is configured to damp motions of the wind turbine tower.

2. The method according to claim 1, wherein the horizontal transport system is supported at least at one position by the tower section, and the movable part is a trolley having a hydraulically operated turn table.

3. The method according to claim 1, wherein the moving the damper unit to the position inside the tower section comprises transporting the damper unit to the position inside the tower section that is spaced from either end of the tower section by at least 4 m.

4. The method according to claim 1, further comprising, prior to the moving the damper unit to the position inside the tower section:
   installing a ladder module in the tower section; and
   rotating the tower section by about 180 degrees around a central longitudinal axis of the tower section so that the ladder module is arranged in an upper part of the tower section.

5. A horizontal transport system for assembling a tower section of a wind turbine tower, wherein the horizontal transport system is configured to be supported at least at one position by the tower section and comprises a movable part attached to a rail configured to support a damper unit and to transport the damper unit in a horizontal direction from a position adjacent to an end of the tower section through the tower section to a position at or adjacent to a mounting position of the damper unit inside the tower section while the tower section is arranged in a horizontal orientation, wherein the movable part is configured to rotate the damper unit within the tower section until a longitudinal direction of the damper unit is substantially perpendicular to a horizontal transport direction through the tower section;

wherein the movable part is a trolley that is configured to run on the rail, wherein the rail is a beam disposed in an upper part of the tower section when the tower section is in the horizontal orientation, and wherein the trolley is configured such that the damper unit hangs below the rail from the trolley.

6. A tower section of a wind turbine tower of a wind turbine, comprising:

a damper unit, wherein the damper unit is configured to damp motions of the wind turbine tower, the damper unit being mounted in the tower section at a mounting position, the mounting position located at a distance of at least 4 meters from either end of the wind turbine tower section, wherein the damper unit is rotatable inside the wind turbine tower while suspended from and hanging below a movable part attached to a rail when the movable part is disposed within the tower section, until a longitudinal direction of the damper unit is substantially perpendicular to a horizontal transport direction through the tower section, the movable part being moved through the tower section along the rail extending from an opening of the tower section to at least the mounting position.

7. The tower section according to claim 6, wherein the damper unit has a longitudinal extension that extends in a cross sectional plane of the tower section, further wherein the longitudinal extension is at least 70%, of an inner diameter of the tower section at the mounting position.

8. The tower section according to claim 6, wherein the damper unit is shaped such that a circle segment corresponding to at least a quarter of an inner cross sectional area of the tower section at the mounting position is not occupied by the damper unit.

9. The tower section according to claim 6, wherein the damper unit comprises a first damper element and a second damper element each having a cylindrical shape and being mounted laterally next to each other in a frame such that a height axes of the first damper element and the second damper element is substantially parallel to a longitudinal axis) of the tower section.

* * * * *